United States Patent
Leman (10) Patent No.: US 6,732,685 B2
(45) Date of Patent: May 11, 2004

(54) ENGINE VALVE ACTUATOR (75) Inventor: Scott A. Leman, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/067,030

(22) Filed: Feb. 4, 2002

(65) Prior Publication Data

US 2003/0145812 A1 Aug. 7, 2003

(51) Int. Cl.[7] .................................. F01L 9/02
(52) U.S. Cl. ...................... 123/90.12; 123/90.16; 123/198 F
(58) Field of Search .................. 123/90.55, 90.59, 123/90.43, 90.46, 90.12, 90.11, 90.16, 198 F (56) References Cited

U.S. PATENT DOCUMENTS

| 4,020,809 | A |   | 5/1977  | Kern et al.   |          |
|-----------|---|---|---------|---------------|----------|
| 4,050,435 | A | * | 9/1977  | Fuller et al. | 123/198 F |
| 4,161,166 | A | * | 7/1979  | Roznovsky     | 123/198 F |
| 4,180,035 | A |   | 12/1979 | Saiki et al.  |          |
| 4,206,728 | A | * | 6/1980  | Trenne        | 123/90.12 |
| 4,423,709 | A | * | 1/1984  | Arrieta       | 123/198 F |
| 4,424,790 | A |   | 1/1984  | Curtil        |          |
| 4,474,008 | A |   | 10/1984 | Sakurai et al. |         |
| 4,572,114 | A |   | 2/1986  | Sickler       |          |
| 5,012,778 | A |   | 5/1991  | Pitzi         |          |

(List continued on next page.)

FOREIGN PATENT DOCUMENTS

| DE | 4440289 A1 | 5/1996 |
| DE | 4443169    | 6/1996 |
| EP | 0961018 A1 | 12/1999 |

Primary Examiner—Thomas Denion
Assistant Examiner—Kyle Riddle
(74) Attorney, Agent, or Firm—Marshall, Gerstein & Borun LLP (57) ABSTRACT An engine with a lockable valve actuator and method of controlling an engine with such an actuator are disclosed. The actuator may include an actuator cylinder with an actuator piston reciprocatingly disposed therein. The actuator piston may be moved by directing pressurized fluid into the actuator cylinder, and locked into a given position by maintaining the pressurized fluid in the actuator cylinder. The actuator may be used in conjunction with a mechanically driven actuator used to move a valve, with the fluidically driven actuator being used to maintain the valve into a desired position.

17 Claims, 7 Drawing Sheets

U.S. PATENT DOCUMENTS

| | | |
|---|---|---|
| 5,191,867 A | 3/1993 | Glassey |
| 5,255,641 A | 10/1993 | Schechter |
| 5,327,858 A * | 7/1994 | Hausknecht ............. 123/90.12 |
| 5,333,456 A | 8/1994 | Bollinger |
| 5,335,633 A | 8/1994 | Thien |
| 5,379,743 A | 1/1995 | Stokes et al. |
| 5,456,222 A | 10/1995 | Schechter |
| 5,479,890 A | 1/1996 | Hu et al. |
| 5,520,161 A | 5/1996 | Klopp |
| 5,546,914 A | 8/1996 | Scheinert |
| 5,549,095 A | 8/1996 | Goto et al. |
| 5,564,386 A | 10/1996 | Korte et al. |
| 5,586,531 A | 12/1996 | Vittorio |
| 5,611,204 A | 3/1997 | Radovanovic et al. |
| 5,619,965 A | 4/1997 | Cosma et al. |
| 5,645,030 A | 7/1997 | Letsche |
| 5,682,854 A | 11/1997 | Ozawa |
| 5,718,199 A | 2/1998 | Hu et al. |
| 5,724,939 A | 3/1998 | Faletti et al. |
| 5,778,674 A | 7/1998 | Kimura |
| 5,787,859 A | 8/1998 | Meistrick et al. |
| 5,809,964 A | 9/1998 | Meistrick et al. |
| 5,813,231 A | 9/1998 | Faletti et al. |
| 5,937,807 A | 8/1999 | Peters et al. |
| 5,967,115 A | 10/1999 | Konopka et al. |
| 6,000,374 A | 12/1999 | Cosma et al. |
| 6,003,316 A | 12/1999 | Baert et al. |
| 6,012,424 A | 1/2000 | Meistrick |
| 6,035,639 A | 3/2000 | Kolmanovsky et al. |
| 6,035,640 A | 3/2000 | Kolmanovsky et al. |
| 6,067,800 A | 5/2000 | Kolmanovsky et al. |
| 6,067,946 A | 5/2000 | Bunker et al. |
| 6,076,353 A | 6/2000 | Freudenberg et al. |
| 6,082,328 A | 7/2000 | Meistrick et al. |
| 6,095,127 A | 8/2000 | Kolmanovsky et al. |
| 6,128,902 A | 10/2000 | Kolmanovsky et al. |
| 6,148,778 A | 11/2000 | Sturman |
| 6,178,749 B1 | 1/2001 | Kolmanovsky et al. |
| 6,189,504 B1 | 2/2001 | Israel et al. |
| 2001/0023671 A1 * | 9/2001 | Vorih ...................... 123/90.12 |
| 2002/0157623 A1 * | 10/2002 | Turner et al. ............ 123/90.12 |

* cited by examiner

FIG. 10

ENGINE VALVE ACTUATOR

TECHNICAL FIELD

This disclosure relates generally to internal combustion engines and, more particularly, to engine valve actuators.

BACKGROUND

The operation of an internal combustion engine requires, among other things, the timed opening and closing of a plurality of valves. For example, with a typical four-stroke, diesel engine, one of ordinary skill in the art will readily recognize such an engine operates through four distinct strokes of a piston reciprocating through a cylinder, with intake and exhaust valves operating in conjunction with the piston. In an intake stroke, the piston descends through the cylinder while an intake valve is open. The resulting vacuum draws air into the cylinder. In a subsequent compression stroke, the piston reverses direction while the intake valve and an exhaust valve are closed, thereby compressing the air within the cylinder. This is followed by a combustion or power stroke wherein fuel is injected into the compressed air and thereby ignited, with the resulting force pushing the piston again in the descending direction while both the intake and exhaust valves are closed. Finally, the piston reverses direction with the exhaust valve open, thereby pushing the combustion gases out of the cylinder.

In certain variations on the typical diesel or Otto cycle, it is desirable to open or close one of the intake and/or exhaust valves at alternative times. For example, in a compression release braking mode, the exhaust valve is opened as the piston approaches a top dead center position during the compression stroke to, in effect, increase engine braking operation. In so doing the engine cylinders draw in air during the intake stroke, compress the air, and then vent the compressed air out of the exhaust valve near top dead center of the piston.

Another mode of engine operation requiring a typical valve sequencing is known as the Miller cycle. During the Miller cycle, the intake valve is held open during the initial stages of the compression stroke. Such operation reduces the effective compression ratio of the engine and results in a more mechanically efficient power producing engine. Alternatively, the intake valve is closed prior to completion of a normal intake stroke to provide Miller cycle benefits.

One other situation modifying typical valve operation is internal exhaust gas recirculation. One disadvantage of diesel or Otto cycle engine operation is that all of the fuel brought into the cylinder and compressed may not entirely combust. Among other things, this phenomenon may be undesirable due to an unacceptably high level of pollutants, such as nitrous oxide (NOx) and particulates, being released during the exhaust stroke.

Exhaust gas recirculation (hereinafter referred to as "EGR") attempts to curtail such drawbacks of conventional engine operation. With EGR, at least a portion of the exhaust gases is not exhausted to the atmosphere, but rather is introduced back into the engine cylinder to be combusted in subsequent power or combustion strokes of the engine. With typical internal EGR, the exhaust gases are expelled through the exhaust valve and re-introduced to the cylinder through the exhaust valve itself. Such a process requires that the exhaust valve stay open not only through the exhaust stroke, but also on the intake stroke, after the piston reverses direction, thereby creating a vacuum and drawing a portion of the exhaust gases back into the cylinder through the still open exhaust valve.

One of ordinary skill in the art will readily appreciate that a substantial force is required to open the exhaust valve and maintain the valve in an open position as the piston reciprocates through the cylinder toward the top dead center position. A valve actuator employing highly pressurized oil may be used to apply this force to open the exhaust valve.

However, holding an exhaust valve in an open position by a valve actuator employing highly pressurized oil requires, for example, pressurized oil on the order of fifteen hundred to five thousand pounds per square inch (10.34 to 34.4 MPa). The engine or machine in which the engine has been mounted therefore has had to provide a high pressure source or high pressure rail and be able to supply the high pressure oil to the actuator when desired. Such a requirement has, among other things, the disadvantage, at least with respect to Miller cycle and EGR operation, of decreasing the engine efficiency in that the engine must continually direct usable work to the high pressure rail to maintain such pressures even though the high pressure oil is only required for a relatively short duration during the engine operation. Not only is the provision of such pressurized fluid taxing on the efficiency of the engine, but with certain machines the provision of such a high pressure rail is simply not available or desirable.

The present disclosure is directed to overcoming one or more of the problems or disadvantages associated with the prior art.

SUMMARY

In accordance with one aspect of the disclosure, an engine valve actuator is provided which comprises an actuator cylinder, an actuator piston reciprocatingly disposed in the cylinder, the actuator piston including a rod associated therewith, a source of pressurized fluid, and a control valve connected in fluid communication with the source of pressurized fluid and the actuator cylinder, the control valve having first and second positions, the first position placing the source of pressurized fluid in fluid communication with the actuator cylinder, the second position maintaining pressurized fluid in the actuator cylinder.

In accordance with another aspect of the disclosure, an engine valve assembly is provided which comprises a valve seat, a valve element adapted to move relative to the valve seat between an open position and a closed position, a mechanically driven actuator adapted to move the valve element to the open position, and a fluidically driven actuator adapted to hold the valve element in the open position.

In accordance with another aspect of the disclosure, an internal combustion engine is provided which comprises a engine cylinder, an engine piston reciprocatingly movable relative to the engine cylinder, an engine valve element disposed in a port connected to the engine cylinder, a valve actuator connected to move the engine valve element, a source of low pressure fluid in fluid communication with the valve actuator, a mechanical linkage mounted proximate the engine valve element and adapted to move the engine valve element, and a control valve adapted to control flow of pressurized fluid from the source of pressurized fluid to the valve actuator.

In accordance with yet another aspect of the disclosure, a method of controlling an engine having at least one valve is provided. The method comprises the steps of moving the valve to an open position, and holding the valve in the open position with an hydraulically locked actuator.

DETAILED DESCRIPTION

Figure 1:
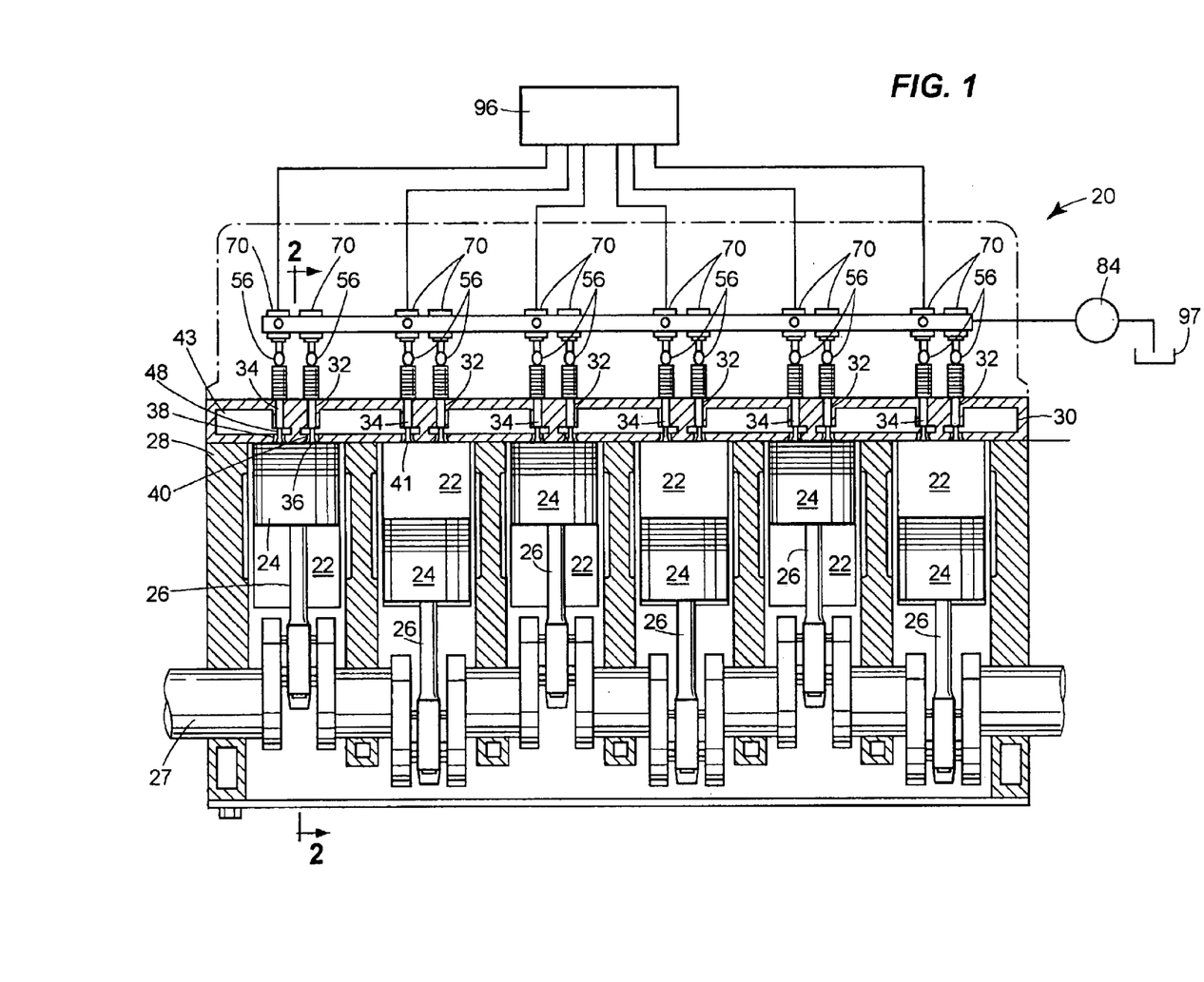
FIG. 1 is a diagrammatic cross-sectional view of an embodiment of an internal combustion engine showing an engine block, cylinder head and engine valve actuator.

Referring now to the drawings, and with specific reference to FIG. 1, an embodiment of an internal combustion engine is generally referred to by reference numeral 20. While the engine 20 is depicted and will be described in further detail herein with reference to a four stroke, internal combustion diesel engine, it is to be understood that the teachings of the disclosure can be employed in conjunction with any other type of engine as well.

The engine 20 may include a plurality of engine cylinders 22 in each of which is reciprocatingly mounted an engine piston 24. In the depicted embodiment, six such engine cylinders 22 and six engine pistons 24 are depicted in aligned fashion, but it is to be understood that a greater or lesser number are possible, and that engine cylinder orientations other than in-line, such as, for example, a "V" configuration, are possible as well. A connecting rod 26 may be connected to each engine piston 24, and in turn be connected to a crank shaft 27 so as to capitalize on the motion of the engine piston 24 to produce useful work in a machine (not shown) with which the engine 20 is associated. Each engine cylinder 24 may be provided within an engine block 28 having a cylinder head 30, and may further include at least one intake valve 32, and an exhaust valve 34.

Referring now to FIGS. 2–5, the cylinder head 30, and a pair of exhaust valves 34 are shown in greater detail for one of the engine cylinders 22. As shown therein, a pair of exhaust ports 38 may be provided in the cylinder head 30 to allow for fluid communication into and out of the engine cylinder 22. In addition, while FIG. 1 depicts only one intake port 36 per cylinder 22, it is to be understood that a pair of intake ports 36 are typically provided in each cylinder 22 in a manner similar to the exhaust ports 38 depicted in FIG. 2. In normal engine operation, air may be allowed to enter the engine cylinder 22 through the intake ports 36, while combustion or exhaust gases may be allowed to exit the engine cylinder 22 through the exhaust ports 38. An intake valve element 40 may be provided within each intake port 36, while an exhaust valve element 42 may be provided within each exhaust port 38.

Figure 2:
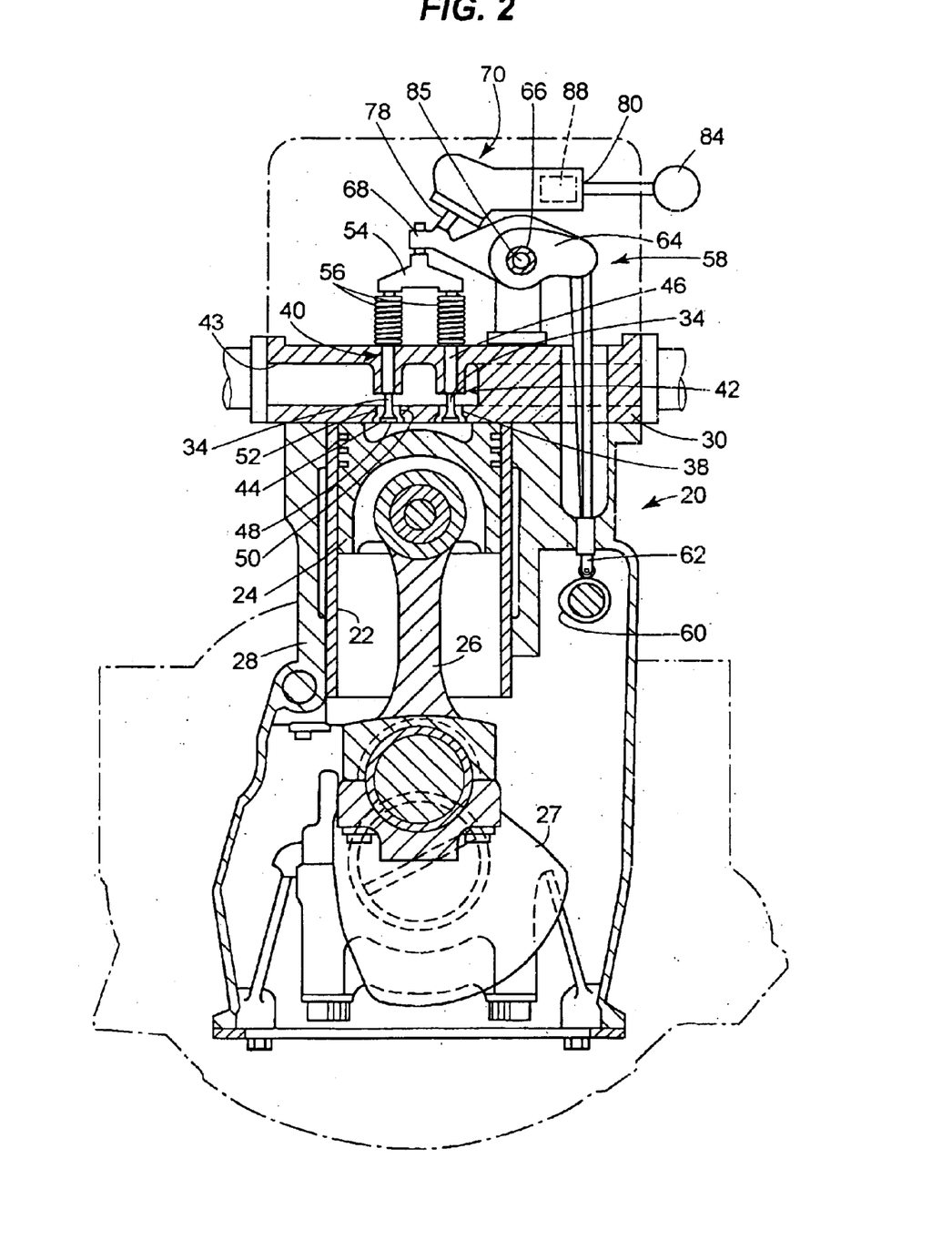
FIG. 2 is cross-sectional view of the engine of FIG. 1, taken along line 2—2 of FIG. 1.

Each of the valve elements 40, 42 may include a valve head 44 from which a valve stem 46 extends. The valve head 44 includes a sealing surface 48 adapted to seal against a valve seat 50 about a perimeter 52 of the valve ports 36, 38. The valve elements 40, 42 further include a bridge 54 adapted to contact the valve stems 46 associated with each engine cylinder 22. A valve spring 56 imparts force between the top of each valve stem 46 and the cylinder head 30, thereby biasing the stem 46 away from the cylinder head 30 and thus biasing the valve head 44 into seating engagement with the corresponding valve seats 50 to close the intake and exhaust valves 32, 34.

As shown best in FIG. 2, movement of the valve elements 40, 42 is controlled not only by the springs 56, but by a cam assembly 58 as well. As one of ordinary skill in the art will readily recognize, rotation of the cam 60 periodically causes a push rod 62 to rise, thereby causing a rocker arm 64, connected thereto, to pivot about a pivot 66. In so doing, an end 68 of the rocker arm 64 is caused to move downwardly and thereby open the exhaust valve element 42. Under normal engine operation, the cam 60 imparts sufficient force to the valve stem 46 to overcome the biasing force of the spring 56 and thereby push the valve head 44 away from the valve seat 50, to open the exhaust valves 34 (or intake valve 32). Further rotation of the cam 60 allows the spring 56 to push the end 68 of the rocker arm 64 upward and the push rod 62 downward until the cam 60 completes another revolution.

Figure 3:
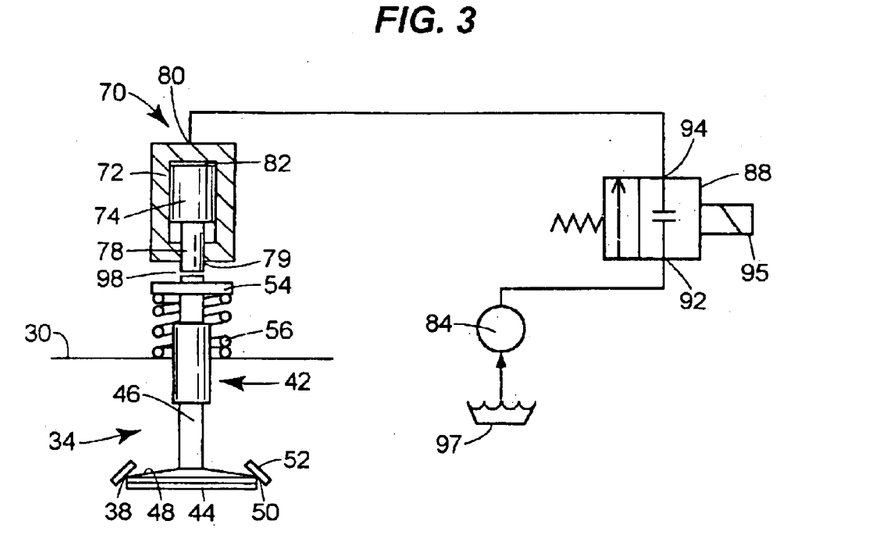
FIG. 3 is a schematic representation of an engine valve actuator shown in a first position.
Figure 4:
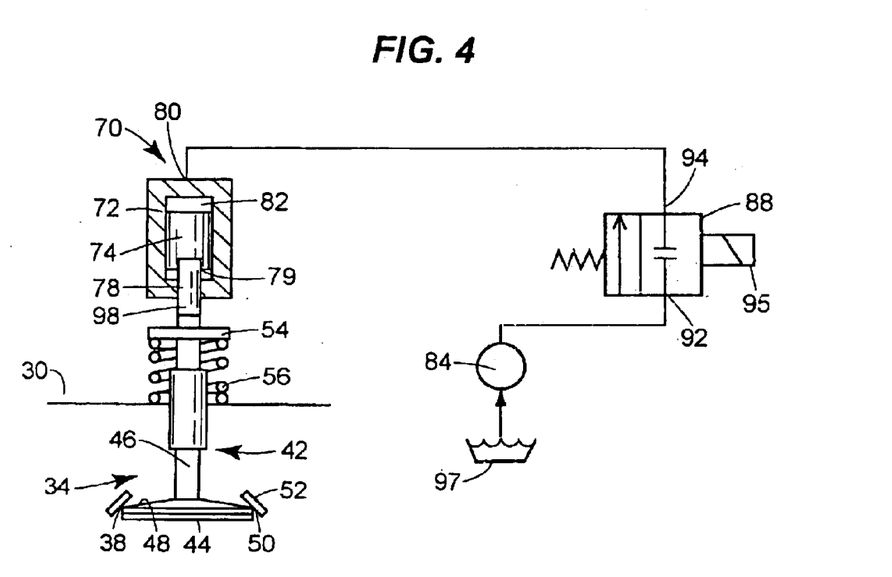
FIG. 4 is a schematic representation of an engine valve actuator shown in a second position.
Figure 5:
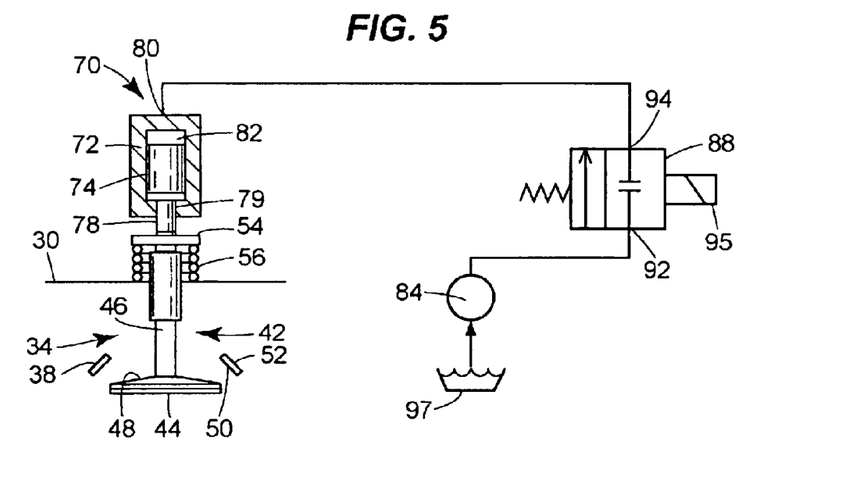
FIG. 5 is a schematic representation of an engine valve actuator shown in a third position.

In certain modes of engine operation, such as with the compression release braking, Miller cycle operation, and EGR referenced above, it is desirable for the intake and/or exhaust valves 32, 34 to be held open for longer periods, or at a timing sequence other than that dictated by the cam 60. In such situations, a valve actuator 70 may be used to so hold the intake valve 32 and/or exhaust valve 34 open. As shown in FIGS. 3–5, one example of the valve actuator 70 includes an actuator cylinder 72 in which an actuator piston 74 is reciprocatingly disposed. The actuator cylinder 72 may include an opening 79, through which an actuator rod 78 may extend in the direction of the rocker arm 64 and the valve stem 46 as well.

The actuator cylinder 72 may also include a port 80 providing access to an actuation chamber 82. The port 80 is adapted to place the actuation chamber 82 into fluid communication with a low pressure fluid source 84. In one embodiment, the pressurized fluid may be lubrication oil of the engine 20 (typically at a pressure level less than one hundred pounds per square inch, for example, on the order of sixty to ninety pounds per square inch (413.7 KPa to 620.5 KPa)). Placement of the fluid source 84 into fluid communication with the actuation chamber 82 may be provided through a fluid passage 85 and be controlled by a control valve 88. The control valve 88 may include an inlet 92 and an outlet 94. The control valve 88 may be biased into a first position connecting the port 80 to the low pressure fluid source 84 and be actuated by a solenoid 95 to a second position disconnecting the port 80 from the low pressure fluid source 84. The solenoid 95 may itself be actuated upon receipt of a control signal or the like from a main control or processor 96 (FIG. 1) of the engine 20. The fluid source 84 may be in fluid communication with an oil drain, sump, or accumulator 97, for example, via a check valve.

The low pressure fluid source 84, when the control valve 88 is in the first position (FIG. 4), is able to fill the actuator chamber 82 sufficiently to move the actuator piston 74 so as to take up any lash 98 (FIG. 3) existing in the system, such as that between the actuator rod 78 and the valve stem 46 or between the actuator rod 78 and the rocker arm 64. "Taking up any lash in the system" is defined herein to mean removing any space between movable components. In so doing, when it is desired to hold the exhaust valve 34 in an open position, the control valve 88 can be moved to the second position (FIG. 5) thereby disconnecting the inlet 92 and hydraulically locking the actuator 70. Pressure within the engine cylinder 22 imparts force on the exhaust valve 34, and in turn the actuator rod 78, but the fluid within the actuator cylinder 72, being incompressible and locked, holds the actuator piston 74, and thus the exhaust valve 34 (or intake valve 32), in the open position.

INDUSTRIAL APPLICABILITY

In operation, the engine 20 can be used in a variety of applications. For example, the engine 20 may be provided on board a prime-mover, vehicle or the like, or any type of machine requiring the provision of mechanical or electrical energy. Such machines may include, but are not limited to, earth moving machines, backhoes, graders, rock crushers, pavers, skid-steer loaders, cranes, trucks, and the like.

Figure 6:
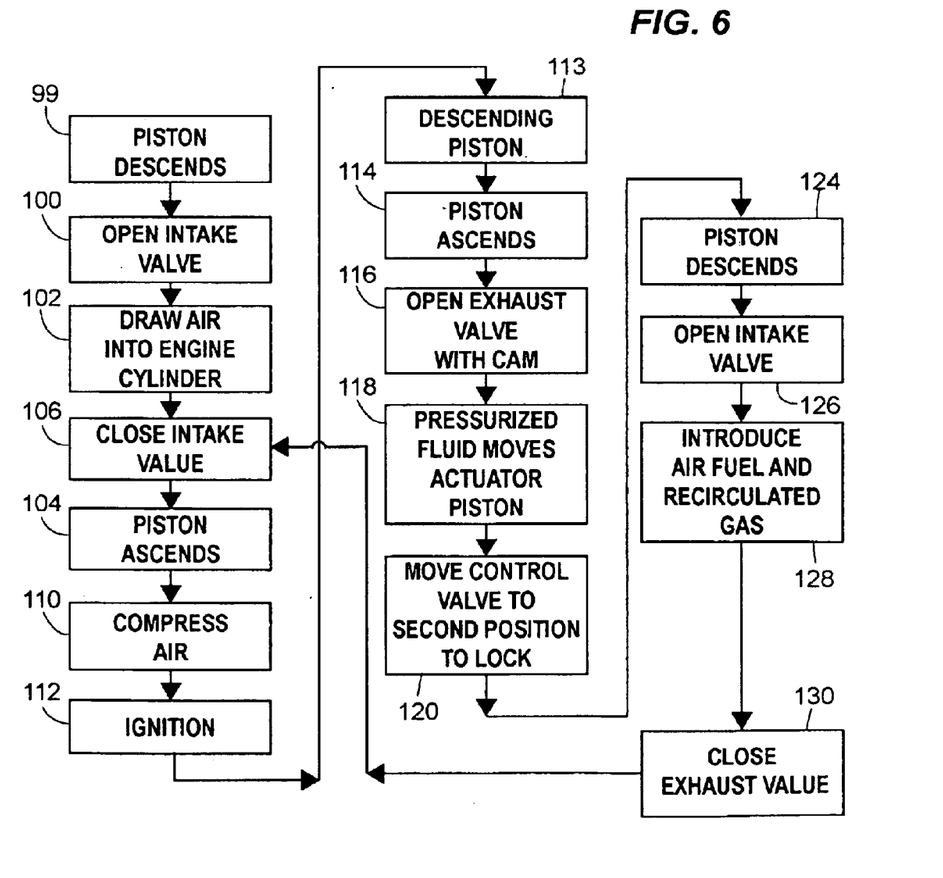
FIG. 6 is a flow chart depicting a sample sequence of steps which may be taken to operate an internal combustion engine valve actuator.

Referring now to FIG. 6, in conjunction with FIGS. 2–5, the engine 20 can be operated so as to open an engine valve and hold an engine valve open in the following manner. By way of background, one of ordinary skill in the art will understand that a typical four-stroke, diesel cycle, internal combustion engine operates through four distinct strokes of the piston 24 through the cylinder 22.

Figure 7:
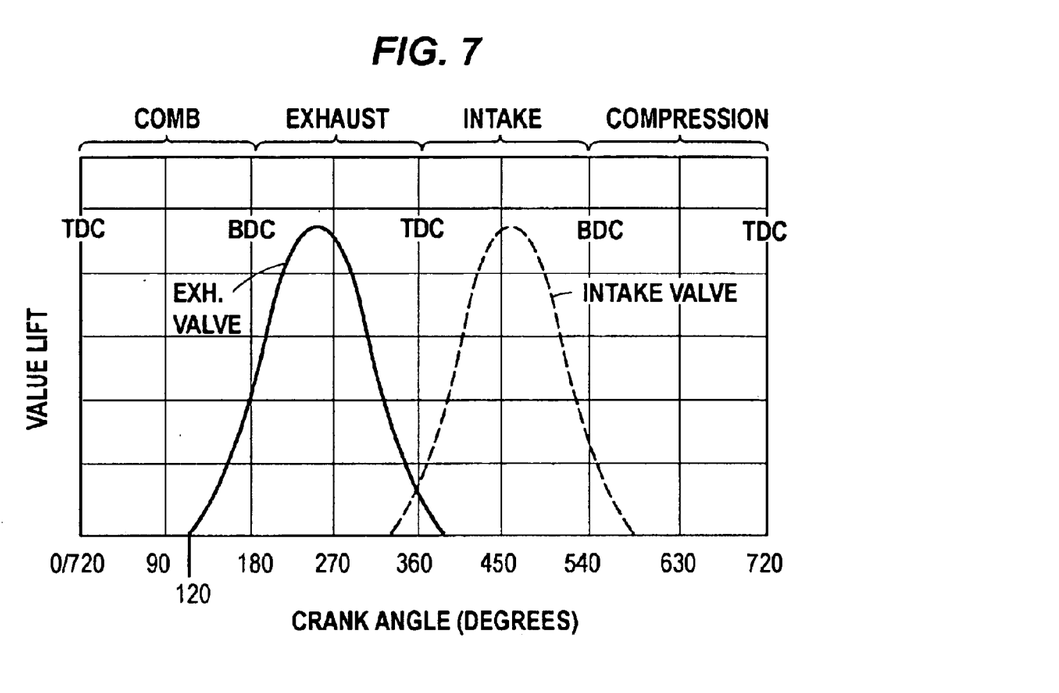
FIG. 7 is a graph plotting valve lift vs. engine crank angle during normal operation.

In a first or intake stroke, the engine piston 24 descends through the engine cylinder 22 away from the cylinder head 30 while the intake valve 32 is opened by the cam assembly 58, as indicated in steps 99 and 100, respectively. FIG. 7 depicts the intake valve 32 and exhaust valve 34 lift of a typical diesel cycle engine wherein engine operation is plotted as seven hundred and twenty degrees of engine crank angle, and with each of the four strokes representing 180° of rotation of the crank shaft 27. In so doing, air is drawn into the engine cylinder 22, as indicated in a step 102.

In a second or compression stroke, the engine piston 24 reverses its motion, at the direction of the rod 26, while the intake valve 32, and exhaust valve 34 are closed with springs 56. Such steps are indicated by reference numerals 104 and 106, respectively, in FIG. 6. As the engine piston 24 ascends through the engine cylinder 22 toward the cylinder head 30, air is compressed (as indicated by a step 110).

In a third or combustion stroke, fuel is injected directly into the compressed air and thereby is ignited, as indicated by a step 112. The resulting explosion and expanding gases push the engine piston 24 again in a descending direction (as indicated by a step 113) through the engine cylinder 22, while the intake and exhaust valves 32, 34 remain closed.

In a fourth or exhaust stroke, the engine piston 24 again reverses and ascends through the engine cylinder 22, but with the exhaust valve 34 open by the cam assembly 58, thereby pushing the combustion gases out of the engine cylinder 22. Such steps are indicated in FIG. 6 as steps 114 and 116, respectively.

Figure 8:
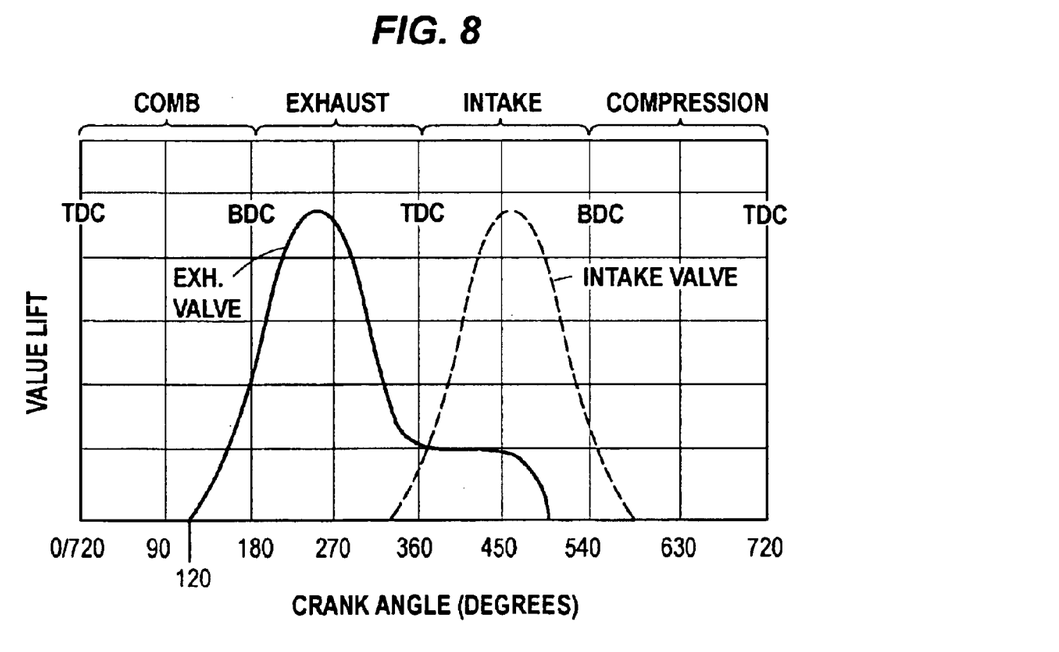
FIG. 8 is a graph plotting valve lift vs. engine crank angle during internal exhaust gas recirculation operation.

With certain engine operation variations, such as compression release braking, Miller cycle operation, and EGR, it may be desirable to alter the above valve timing and hold one or more valves open against substantial cylinder pressures. The teachings of the present disclosure enable such operation, without resort to highly pressurized oil rails, thereby preserving engine efficiency and simplicity. Taking internal EGR as an example, it is necessary in such operation for the exhaust valve 34 (or intake valve 32) to remain open throughout not only the exhaust stroke, but during an interim period between when the exhaust valve 34 is normally closed and when the intake valve 32 opens to conduct the intake stroke. FIG. 8 depicts such altered valve timing in graphical form.

This can be accomplished by allowing the cam assembly 58 to open the exhaust valve 34 according to a normal exhaust stroke as indicated above (step 116), and then using the actuator 70 to maintain the exhaust valve 34 in an open position. More specifically, as the cam assembly 58 moves to open the exhaust valve 34, the rocker arm 64 pivots downwardly compressing the spring 56. With the spring pressure overcome by the cam assembly 58, the pressurized fluid flowing from the low pressure source 84 and filling the actuation chamber 82 is able to move the piston 74. The piston 74 moves through the lash 98 until the actuator rod 78 engages the rocker arm 64. This step is indicated by reference numeral 118 in FIG. 6.

In order to hold the exhaust valve 34 in such a position even after the cam 60 rotates to another position, the control valve 88 is switched from the first position (shown in FIG. 4) to the second position (shown in FIG. 5), as indicated by step 120. In so doing, the fluid is locked from escaping the actuation chamber 82 and, due to its incompressibility, prevents the actuator piston 74 from moving and, thus, prevents the exhaust valve 34 from closing. As used herein, a "hydraulically locked" device is defined as a device having substantially no fluid flow and substantially no fluid leakage, and "backflow" is defined as fluid flow from the actuator 70 to the low pressure fluid source 84.

Figure 10:
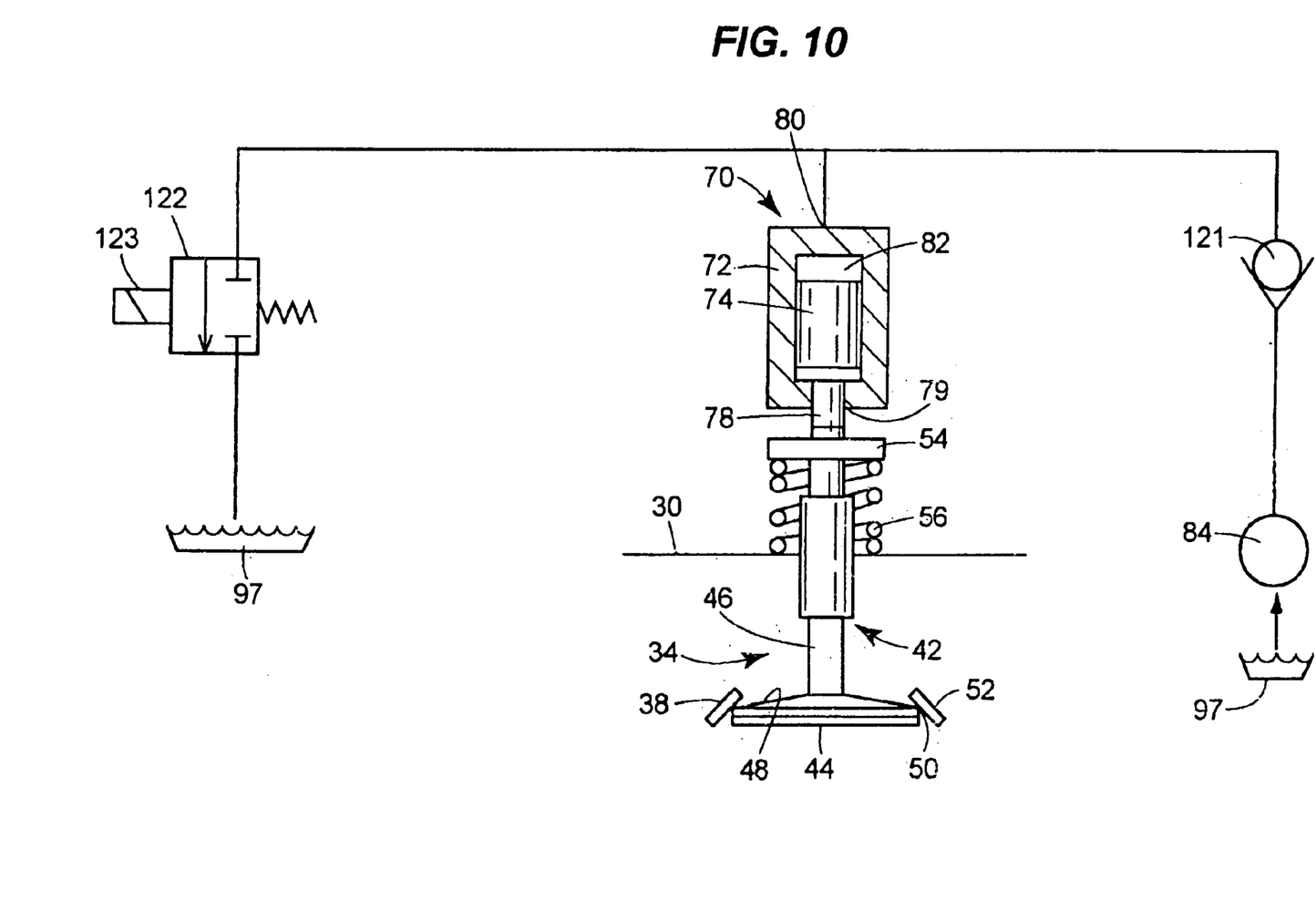
FIG. 10 is a schematic representation of an alternative engine valve actuator configuration.

In addition to the above example, the actuator 70 may be hydraulically locked using any number of other devices including, but not limited to, check valves. For example, as shown in FIG. 10, a check valve 121 can be provided between the actuator 70 and the low pressure source 84. The check valve allows the fluid from source 84 to enter the actuator cylinder 72 and move the actuator piston 74, but not flow back to the source 84. In conjunction with such structure, a normally closed control valve 122 may be provided also in communication with the low pressure source 84 (or drain 97 or atmosphere). Upon actuation of solenoid 123 of the control valve 122, the fluid pressure with the actuator cylinder 72 is able to flow to the low pressure source 84 or drain 97. In so doing, the actuator piston 74 is able to move up, closing the valve 32, 34.

Continuing with the example of EGR, the exhaust valve 34 is held open as the engine piston 24 ascends to a top dead center position, and remains open after the engine piston 24 reverses and descends while the intake valve 32 is opened, as indicated by steps 124 and 126, respectively. A portion of the exhaust gases vented from the engine cylinder 22 through the exhaust valve 34 are thereby reintroduced to the engine cylinder 22 by the resulting pressure differential. This step is indicated by reference numeral 128. After a predetermined stroke length (e.g., ninety degrees of a seven hundred and twenty degree four stroke cycle as shown in FIG. 8), the exhaust valve 34 is closed as indicated by a step 130, while the intake valve 32 remains open to complete the intake stroke as explained above. The exhaust valve 34 can be closed by switching the control valve 88 back to the first position (shown in FIG. 4) and thereby enabling the spring 56 to push the actuator piston 74 up, and the pressurized fluid out of, the actuator cylinder 72. Normal engine operation may then resume, beginning with the compression stroke as indicated in FIG. 6.

Figure 9:
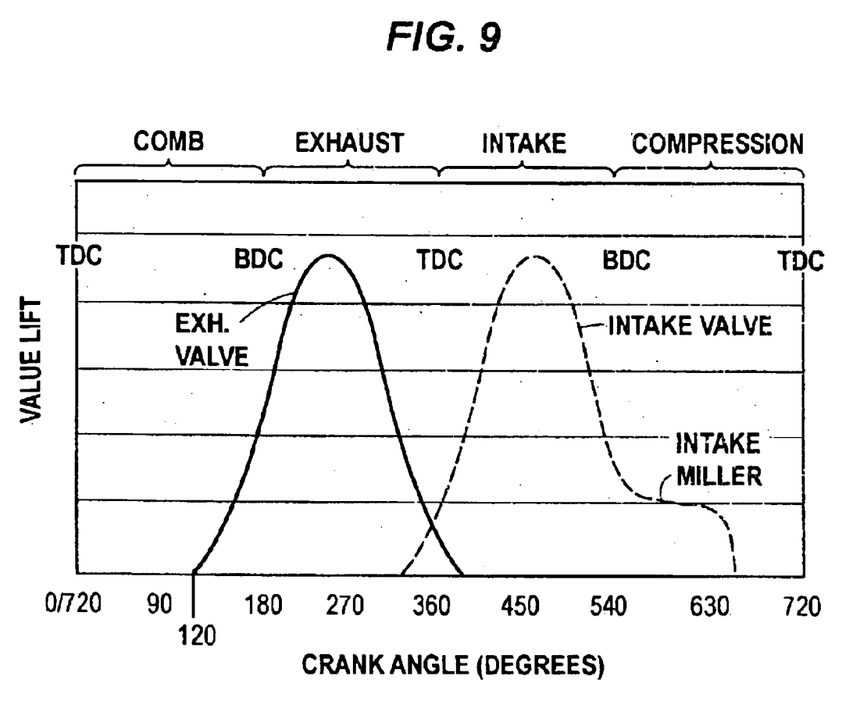
FIG. 9 is a graph plotting valve lift vs. engine crank angle during Miller cycle operation.

The teachings of the present disclosure can also be used to provide Miller cycle benefits. As illustrated in FIG. 9, the intake valve 32 (or exhaust valve 34) may be held open during the initial stages of the compression stroke to thereby reduce the compression ratio of the engine and provide the engine efficiencies of the Miller cycle as well known by those of ordinary skill in the art. The intake valve 32 could be so held by employing the actuator 70 after the cam assembly 58 opens the intake valve during the intake stroke. More specifically, as the intake valve 32 is about to be closed by the spring 56 at the conclusion of a normal intake stroke, the control valve 88 could be actuated so as to prevent fluid flow from the actuator 72 back to the low pressure fluid source 84. In so doing, the actuator piston 74 is locked in position, as is the intake valve 32 as depicted in FIG. 9.

One of ordinary skill in the art will understand that significant force is required to open the intake and exhaust valves 32, 34, and hold the valves open, during the compression and exhaust strokes, due to the ascending piston and pressurized gases being pushed out of the engine cylinder 22 and thus against the valves 32, 34. The actuator 70, and its ability to become hydraulically locked, is able to hold the valves 32, 34 open under such conditions, without resort to high pressure rails and the drops in engine efficiency incumbent with such conventional systems.

Other aspects and features of the present disclosure can be obtained from a study of the drawings, the disclosure, and the appended claims.

What is claimed is:

1. An engine valve assembly, comprising:
   a valve seat;
   an engine valve element adapted to move relative to the valve seat between an open position and a closed position;
   a mechanically driven actuator being adapted to move the valve element to the open position; and
   a fluidically driven actuator being adapted to hold the valve element in the open position, the fluidically driven actuator including an actuator piston reciprocatingly disposed in an actuator cylinder, the actuator piston having a rod operatively associated therewith and being adapted to move the rod and maintain the engine valve element in the open position, the actuator cylinder being in fluid communication with a source of pressurized fluid, the source of pressurized fluid being a lubricational system of the internal combustion engine and having a magnitude of pressure less than 100 pounds per square inch.

2. The engine valve assembly of claim 1, including a control valve adapted to pass the flow of the pressurized fluid to the actuator cylinder during movement of the valve element toward the open position, and maintain the pressurized fluid in the actuator cylinder during movement of the valve element toward the closed position.

3. The engine valve assembly of claim 1, including a spring connected to the engine valve element and biasing the engine valve element toward the closed position.

4. An internal combustion engine, comprising:
   an engine cylinder;
   an engine piston reciprocatingly movable relative to the engine cylinder;
   an engine valve element disposed in a port connected to the engine cylinder;
   a fluidically driven valve actuator;
   a source of low pressure fluid in fluid communication with the valve actuator, a force generated by the source of low pressure fluid being sufficient to move the valve element and take up any lash associated with the valve element and the valve actuator;
   an engine driven mechanical linkage mounted proximate the engine valve element and adapted to move the engine valve element; and
   a control valve adapted to control flow of the pressurized fluid from the source of low pressure fluid to the valve actuator.

5. The internal combustion engine of claim 4, wherein the valve actuator includes an actuator cylinder and an actuator plunger reciprocatingly disposed in the actuator cylinder.

6. The internal combustion engine of claim 4, including a coil spring mounted about the valve element and biasing the valve element toward a closed position.

7. The engine of claim 4, wherein the source of low pressure fluid is a lubrication oil system of the internal combustion engine.

8. The internal combustion engine of claim 4, including a cam shaft, and wherein the mechanical linkage is actuated by the cam shaft.

9. An internal combustion engine, comprising:
   an engine cylinder;
   an engine piston reciprocatingly movable relative to the engine cylinder;
   an engine valve element disposed in a port connected to the engine cylinder;
   a fluidically driven valve actuator;
   a source of low pressure fluid in fluid communication with the valve actuator;
   an engine driven mechanical linkage mounted proximate the engine valve element and adapted to move the engine valve element; and
   a control valve adapted to control flow of the pressurized fluid from the source of low pressure fluid to the valve actuator, said control valve being adapted to hydraulically lock the fluid driven actuator and prevent fluid from escaping the actuator.

10. A method of controlling an engine having at least one valve, comprising the steps of:
    moving the valve to an open position with a mechanically driven actuator; and
    holding the valve in the open position with a hydraulically locked actuator, a source of low pressure fluid being in communication with the hydraulically locked actuator, and a control valve being adapted to control flow of the low pressure fluid from the source of low pressure fluid to the hydraulically locked valve actuator, wherein the step of holding the valve in the open position includes directing pressurized fluid to the actuator cylinder, and preventing backflow of a fluid out of the actuator cylinder.

11. The method of claim 10, including the step of holding an intake valve in the open position with a hydraulically locked actuator.

12. The method of claim 10, including the step of holding an exhaust valve in the open position with a hydraulically locked actuator.

13. The method of claim 10, wherein the moving step includes the step of using a mechanical linkage.

14. The method of claim 10, wherein the moving step includes the step of using a mechanical linkage having a cam.

15. The method of claim 10, wherein the holding step includes the step of using a hydraulically locked actuator having an actuator cylinder having an actuator piston reciprocatingly disposed in the actuator cylinder, wherein the step of holding the valve in the open position includes directing pressurized fluid to the actuator cylinder, and preventing backflow of a fluid out of the actuator cylinder.

16. The method of claim 10, wherein the step of preventing backflow is performed by a control valve.

17. The method of claim 10, wherein the pressurized fluid is lubrication oil of the engine.

* * * * *